US011069260B2

(12) United States Patent
Baker et al.

(10) Patent No.: US 11,069,260 B2
(45) Date of Patent: Jul. 20, 2021

(54) ROTATABLY UNLOCKED RESETTABLE SHIELD ACTUATED AUTOINJECTOR TRAINING DEVICE

(71) Applicant: NOBLE INTERNATIONAL, INC., Orlando, FL (US)

(72) Inventors: Jeff Baker, Orlando, FL (US); Tingting Liu, Orlando, FL (US); Christopher Wai Yin Chung, Orlando, FL (US); Shishuang Hou, Ningbo (CN)

(73) Assignee: Noble International, Inc., Orlando, FL (US)

(*) Notice: Subject to any disclaimer, the term of this patent is extended or adjusted under 35 U.S.C. 154(b) by 762 days.

(21) Appl. No.: 15/893,535

(22) Filed: Feb. 9, 2018

(65) Prior Publication Data
US 2019/0251867 A1    Aug. 15, 2019

(51) Int. Cl.
*G09B 23/28* (2006.01)

(52) U.S. Cl.
CPC .................. *G09B 23/285* (2013.01)

(58) Field of Classification Search
CPC .................................................... G09B 23/285
USPC .......................................... 434/260; 604/506
See application file for complete search history.

(56) References Cited

U.S. PATENT DOCUMENTS

| 5,071,353 A | * | 12/1991 | van der Wal | ....... A61M 5/2033 |
| | | | | 434/262 |
| 10,089,902 B2 | * | 10/2018 | Baker | .................. G09B 19/24 |
| 10,311,754 B2 | * | 6/2019 | Baker | .................. G09B 23/285 |
| 10,529,252 B2 | * | 1/2020 | Baker | .................. G09B 23/285 |
| 2014/0288529 A1 | * | 9/2014 | Baker | ............... A61M 5/14212 |
| | | | | 604/506 |

OTHER PUBLICATIONS

AZPI Central. "Instructions for use." https://www.azpicentral.com/bydureon_bcise/bydureon_bcise_ifu.pdf#page=1 pp. 1-6.

* cited by examiner

*Primary Examiner* — Jerry-Daryl Fletcher
*Assistant Examiner* — Jennifer L Korb
(74) *Attorney, Agent, or Firm* — Timothy H Van Dyke; Wolter Van Dyke Davis, PLLC

(57) ABSTRACT

A resettable injection training device embodiment including an outer housing having a proximal end and a distal end, the housing defining a chamber there within, a safety shield having a proximal end and a distal end, the safety shield having a retracted, locked position, a first extended unlocked position, a second extended unlocked position, and a second extended locked position is described herein. The device embodiment including a plunger having a proximal a distal end, the plunger having a retracted and an extended position. The device may include a rotating plunger locking collar, an unlocking member coupled to the plunger, wherein rotation of the unlocking member from a first position to a second position unlocks the device and releases the safety shield from the retracted, locked position. The device may further include a resetting cap for resetting the device for a subsequent use.

18 Claims, 16 Drawing Sheets

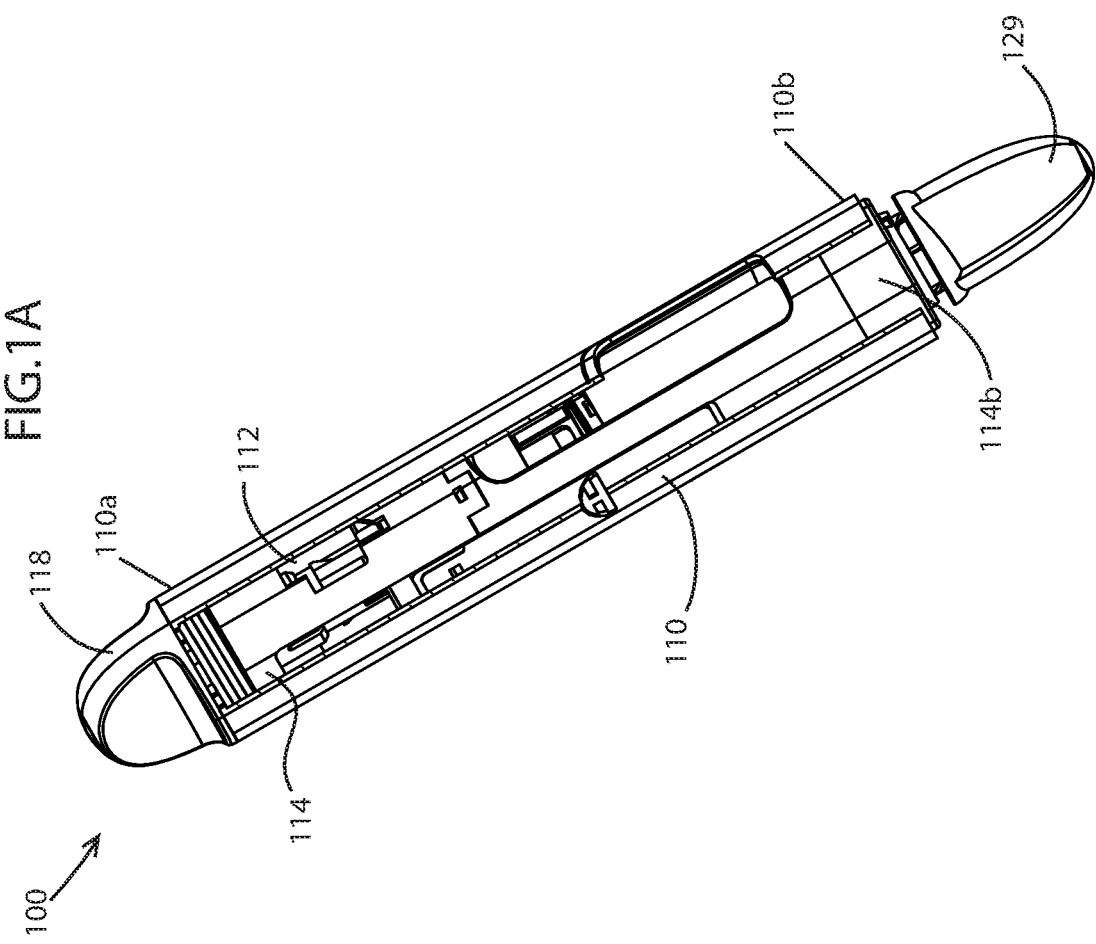

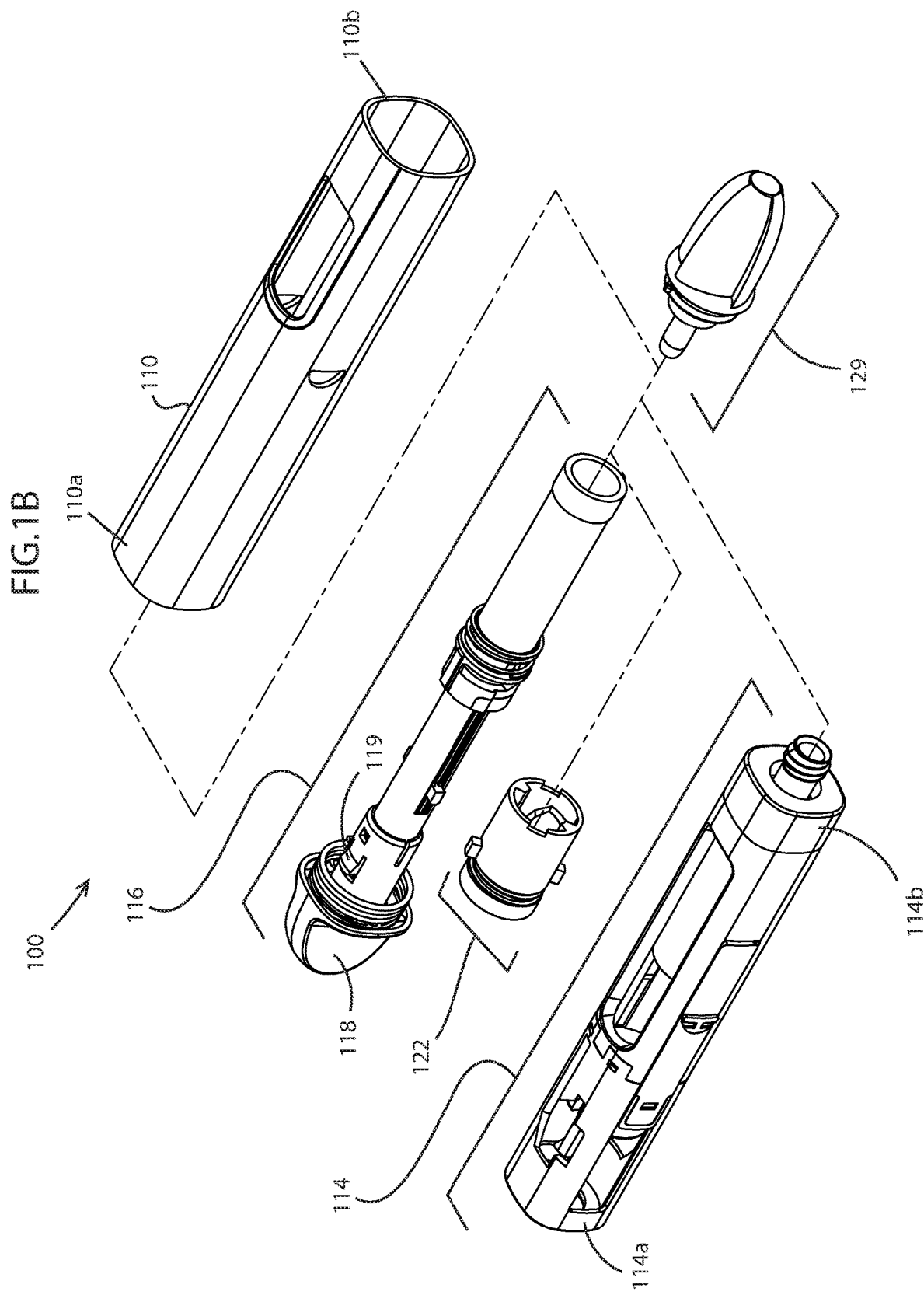

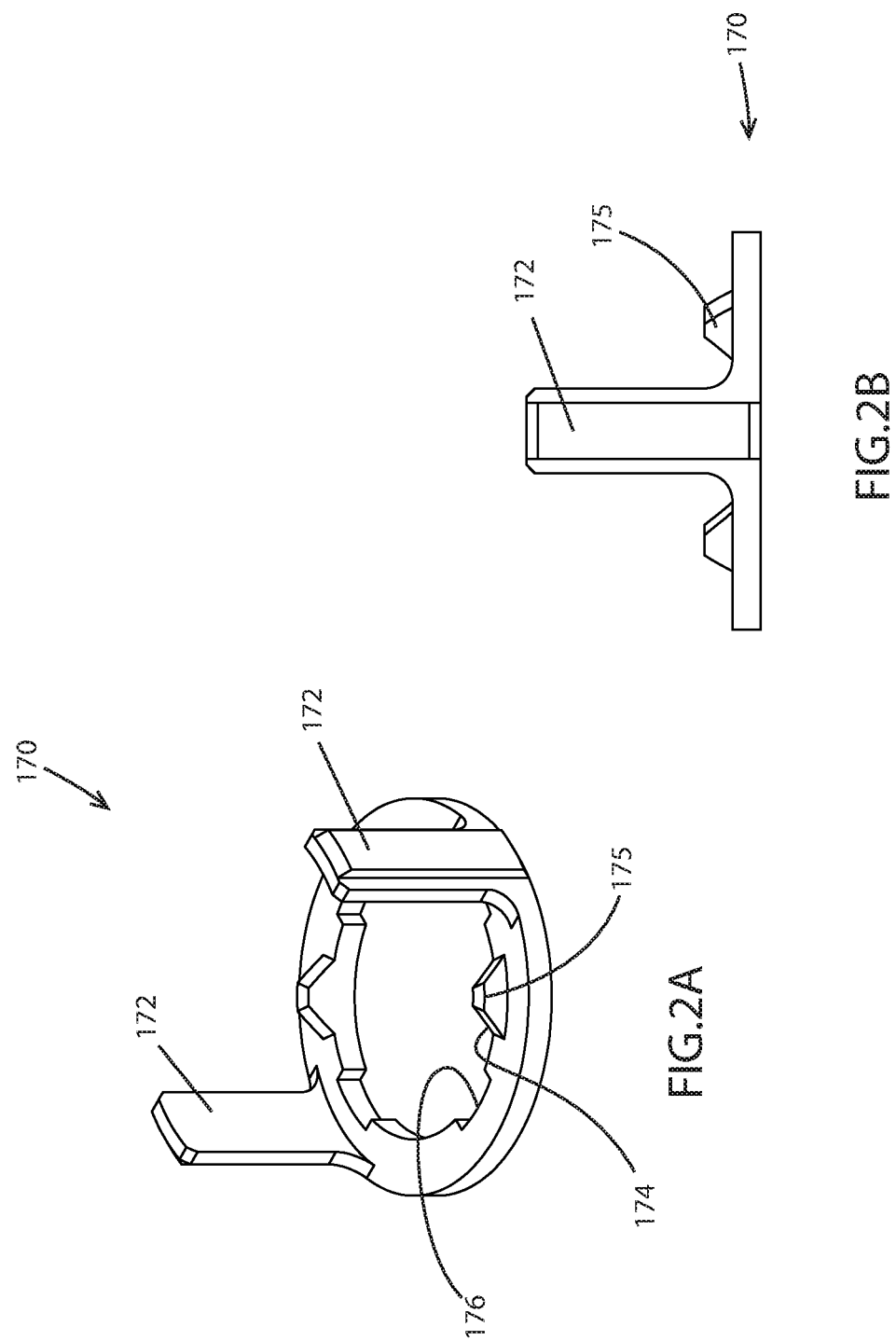

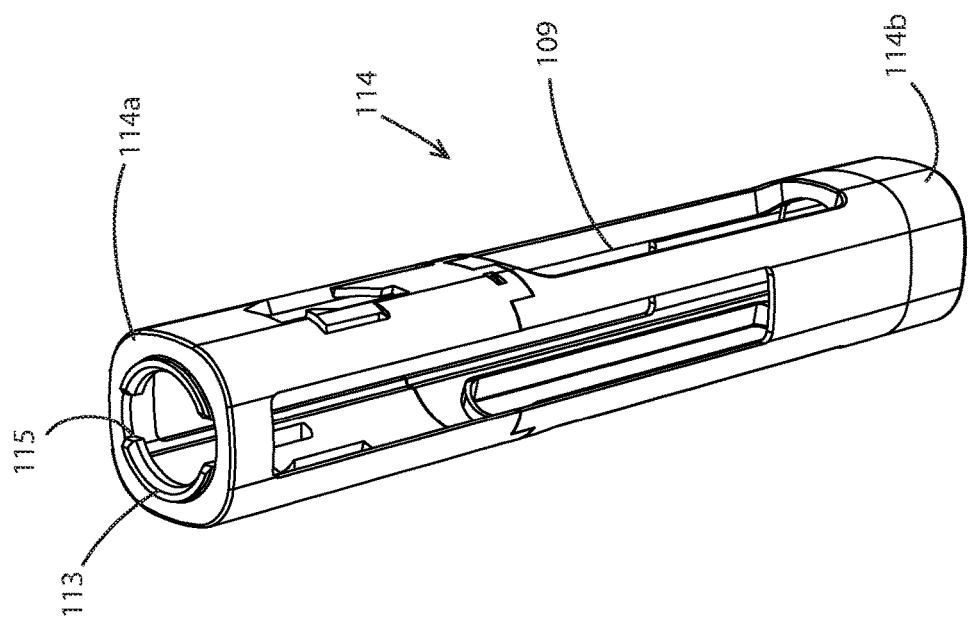
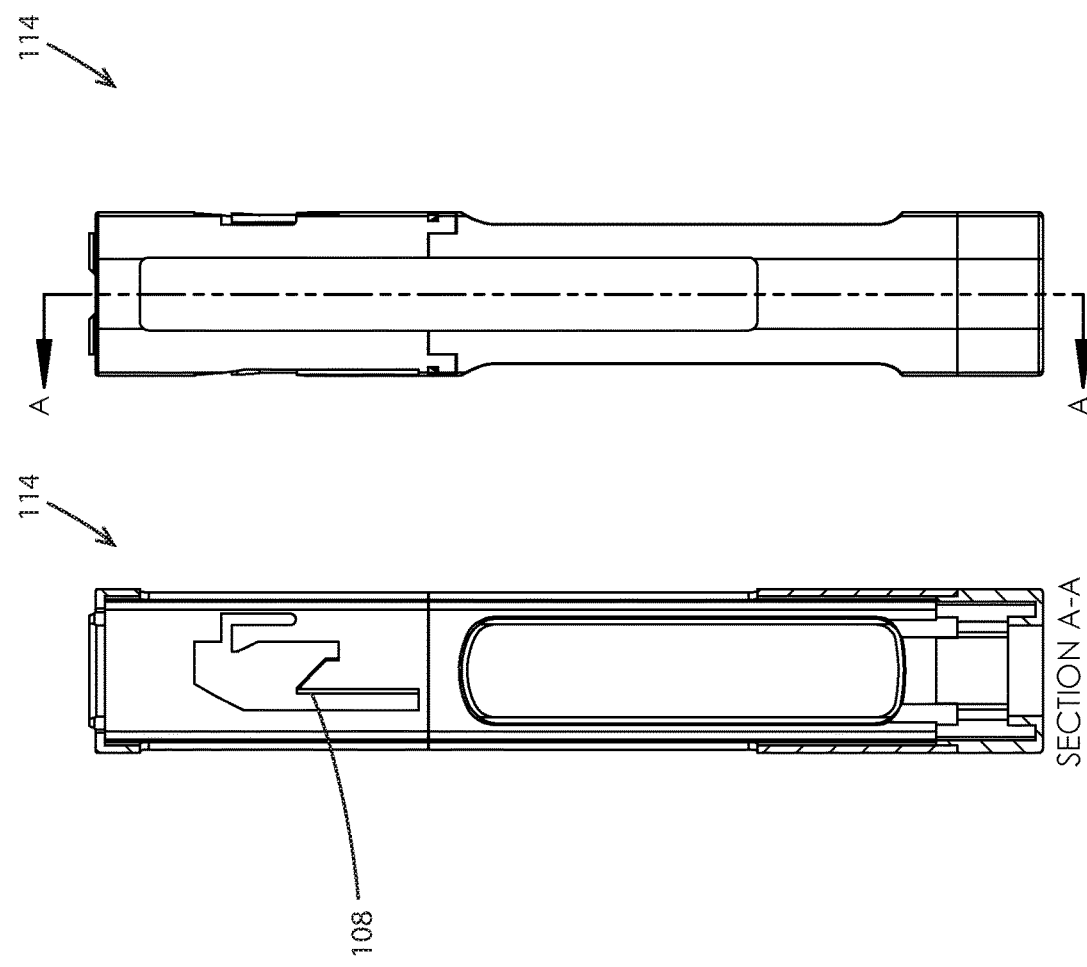

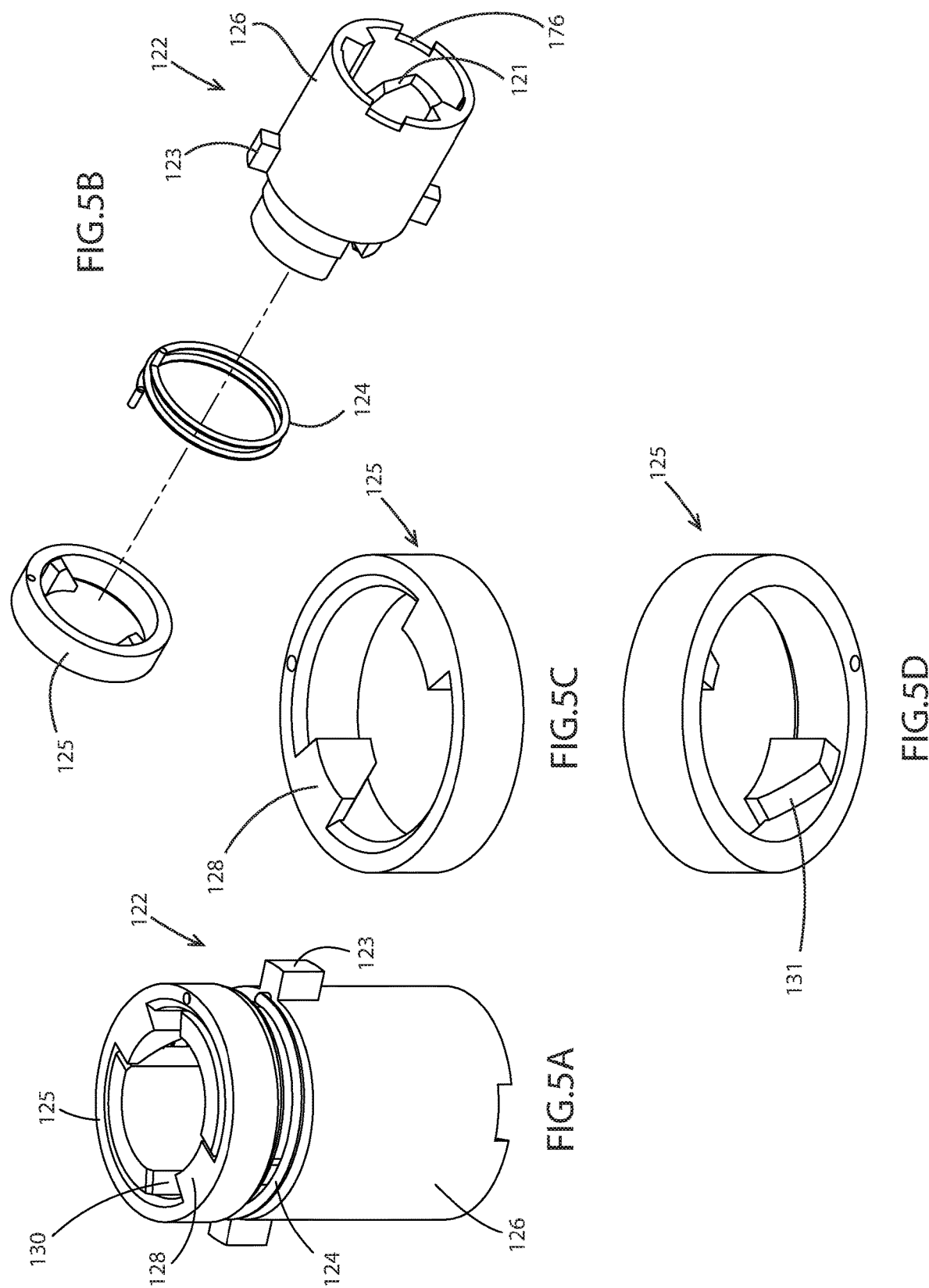

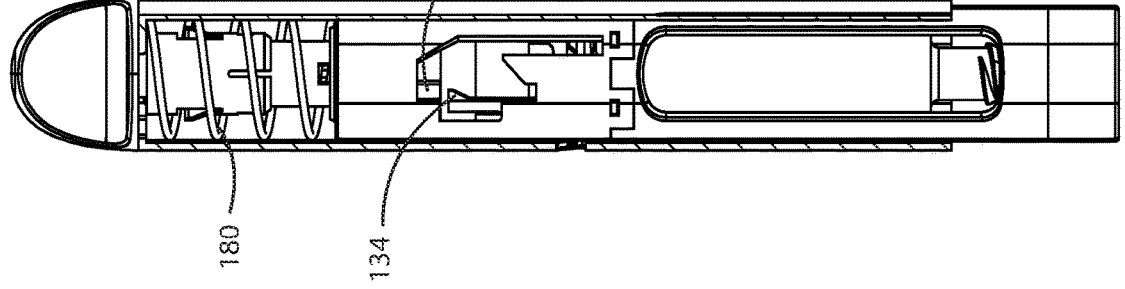
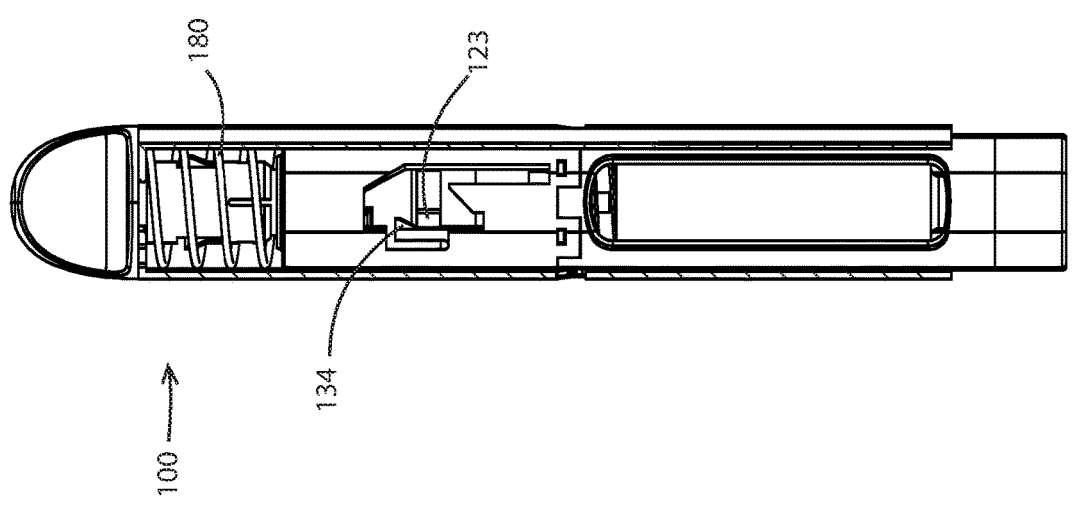

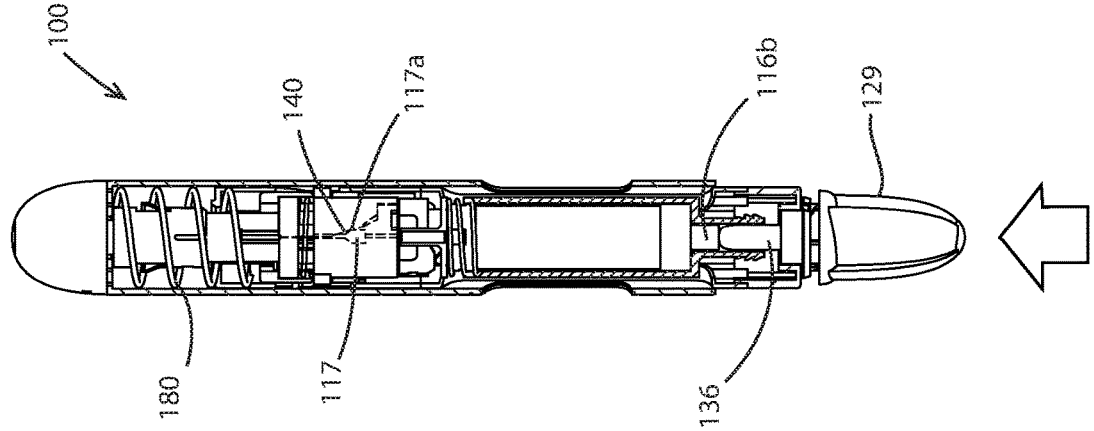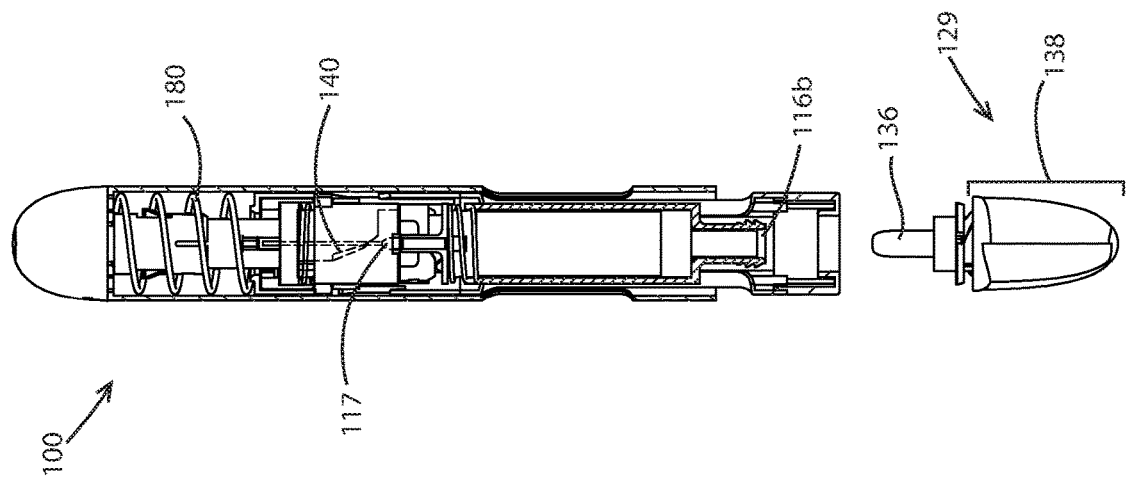

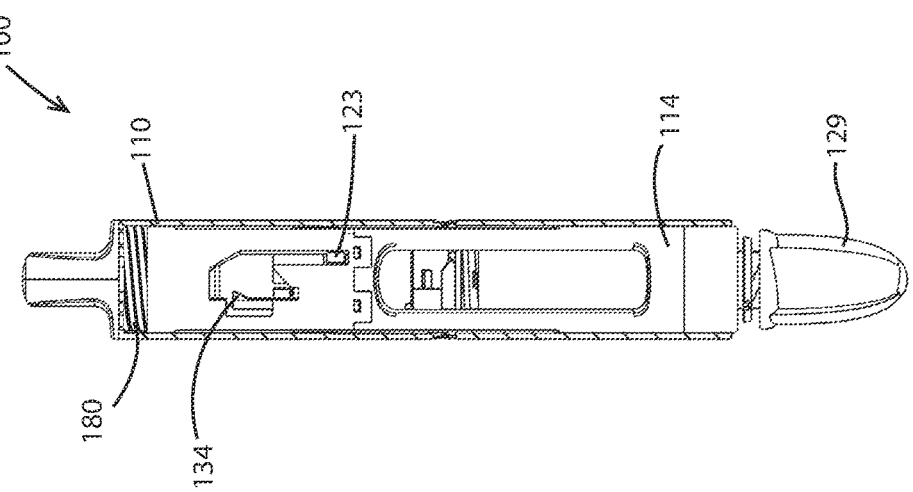
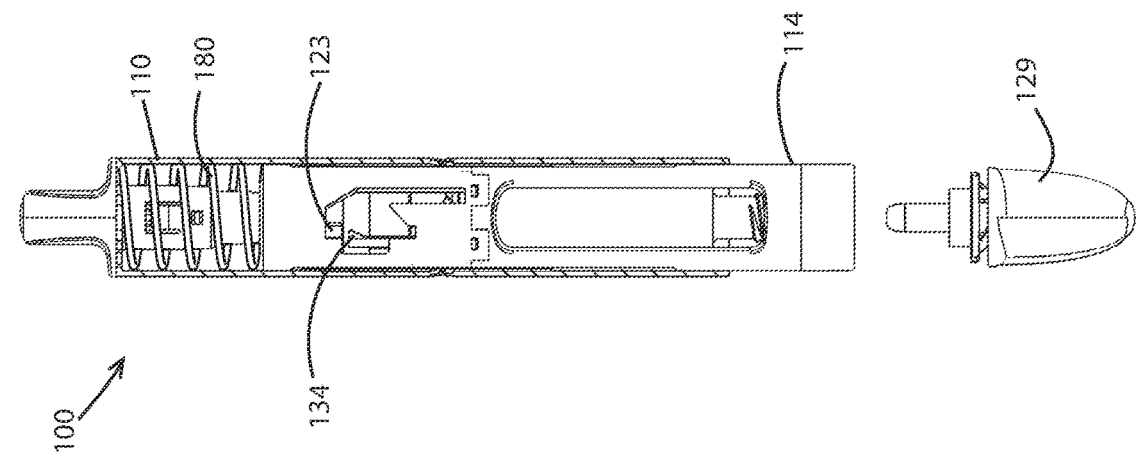

ROTATABLY UNLOCKED RESETTABLE SHIELD ACTUATED AUTOINJECTOR TRAINING DEVICE

BACKGROUND

Injection devices have recently become increasingly popular for single dose or multi-dose, at home self-administration. These devices include both auto-injection devices and pre-filled syringe devices, and are often designed to accomplish two basic objectives: convenience of drug delivery in an outpatient or at home setting, and/or automation of drug delivery in an outpatient or at-home setting.

Injectable medications are required for a number of varying illnesses and diseases. A number of injectable medications require self-injection by a patient. Self-injection of a medicament using a device having a needle carries with it a certain stigma. Oftentimes patients are wary of injecting themselves for fear or anxiety related to failing to receive a complete dose of the medication, pain associated with injecting oneself with the needle, accidentally sticking oneself with the needle, and difficulties in adequately grasping the dosing mechanism to inject oneself, among other concerns. These fears and anxieties associated with the currently available self-injection devices may result in the administration of an incomplete dose of a medicament, failure to administer any portion of the dose of a medicament, or accidentally sticking oneself with the needle of the device, which in some instances could lead to unwanted transmission of diseases if the needle is contaminated.

An additional concern that exists with regard to injection devices is that users with little or no medical knowledge or experience are injecting themselves or injecting others using these devices. Performing a medical treatment or test on oneself or others carries with it certain risks and often creates a level of anxiety for the user performing the treatment or test. It has proven beneficial in the medical field to practice various medical techniques including drug delivery, specifically where it relates to injections and other invasive drug delivery means prior to delivering the medications to a patient in need, and particularly in the case of self-administration of medicaments. Training devices are helpful in reducing anxiety associated with self administering medical treatment, as well as increasing efficiency and accuracy in providing the treatment to patients. Medical devices can be intimidating to use; the fear associated with giving oneself an injection, for example, can be traumatic. This fear is increased in persons with little or no experience in self-administration of medications. Consequently, devices to assist in training individuals to inject themselves or otherwise self-administer medication are beneficial in decreasing or preventing the anxiety associated with medicament delivery. Safe use and re-use of these training devices requires a resettable device. Therefore, a device which allows repeated practice and ease of use to enhance familiarity with the injection device and the self-injection process, along with the ability to safely and efficiently reset the device is paramount to an effective device for injection training.

SUMMARY

In one embodiment, a resettable injection training device is provided including an outer housing having a proximal end and a distal end, the housing defining a chamber there within, a safety shield having a proximal end and a distal end, the safety shield having a retracted, locked position, a first extended unlocked position, a second extended unlocked position, and a second extended locked position, and a plunger having a proximal end and a distal end, the plunger having a retracted position and an extended position. The device may further include a rotating plunger locking collar, an unlocking member coupled to the plunger, wherein rotation of the unlocking member from a first position to a second position unlocks the device and releases the safety shield from the retracted, locked position, and a resetting cap, wherein removal of the resetting cap from a distal end of the housing allows the safety shield to move from the first extended unlocked position to the second extended unlocked position.

In another embodiment, a method of resetting a resettable injection training device is provided, having a safety shield in a second extended, locked position and a plunger is in an extended position. The method includes inserting a resetting cap into a distal end of a resettable injection training device having a proximal end and a distal end, the device comprising an outer housing defining a chamber there within, a safety shield having a retracted locked position, a first extended unlocked position, a second extended unlocked position, and a second extended locked position, a plunger having a retracted position and an extended position, and a rotating plunger locking collar, wherein the safety shield is in the second extended, locked position, and moving the cap in a proximal direction relative to the device to contact the plunger and reset the plunger from an extended position to the retracted position, and reset the safety shield from the second extended, locked position to the retracted, locked position.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 1A is a perspective view of a resettable injection training device embodiment.

FIG. 1B is an exploded view of the device shown in FIG. 1A.

FIG. 2A shows a perspective view of a rail guide embodiment.

FIG. 2B shows a side view of the rail guide embodiment.

FIG. 3A is a perspective view of a safety shield embodiment.

FIG. 3C is a cross-sectional view of the safety shield shown in FIG. 3D, taken at A-A of FIG. 3D.

FIG. 3D is a side view of an embodiment of a safety shield.

FIG. 5A is a perspective view of a rotating plunger locking collar embodiment.

FIG. 5B is an exploded view of the rotating plunger locking collar embodiment of FIG. 5A.

FIG. 5C is a perspective view of a locking collar ring of the rotating plunger locking collar.

FIG. 5D is another perspective view of a locking collar ring of the rotating plunger locking collar.

FIG. 13 is a partial cutaway view of the device embodiment partway during removal of the force on the distal safety shield end.

FIG. 14 is a partial cutaway view of the device embodiment once the force on the distal safety shield end has been fully removed.

FIG. 17 is a partial cutaway view of a device embodiment, showing the internal components of the device immediately prior to reset, once the unlocking member has been locked.

FIG. 18 is a partial cutaway view of the device embodiment, showing movement of the resetting cap into the device and interaction of internal components during reset.

FIG. 19 shows a partial cutaway view of the embodiment of the device at the same stage as shown in FIG. 17, prior to reset, providing a view of the outer components of the device.

FIG. 20 shows a partial cutaway view of the embodiment of the device upon full reset with the reset cap, as shown in 18, wherein the outer components of the device are shown.

DETAILED DESCRIPTION

Figure 3B:
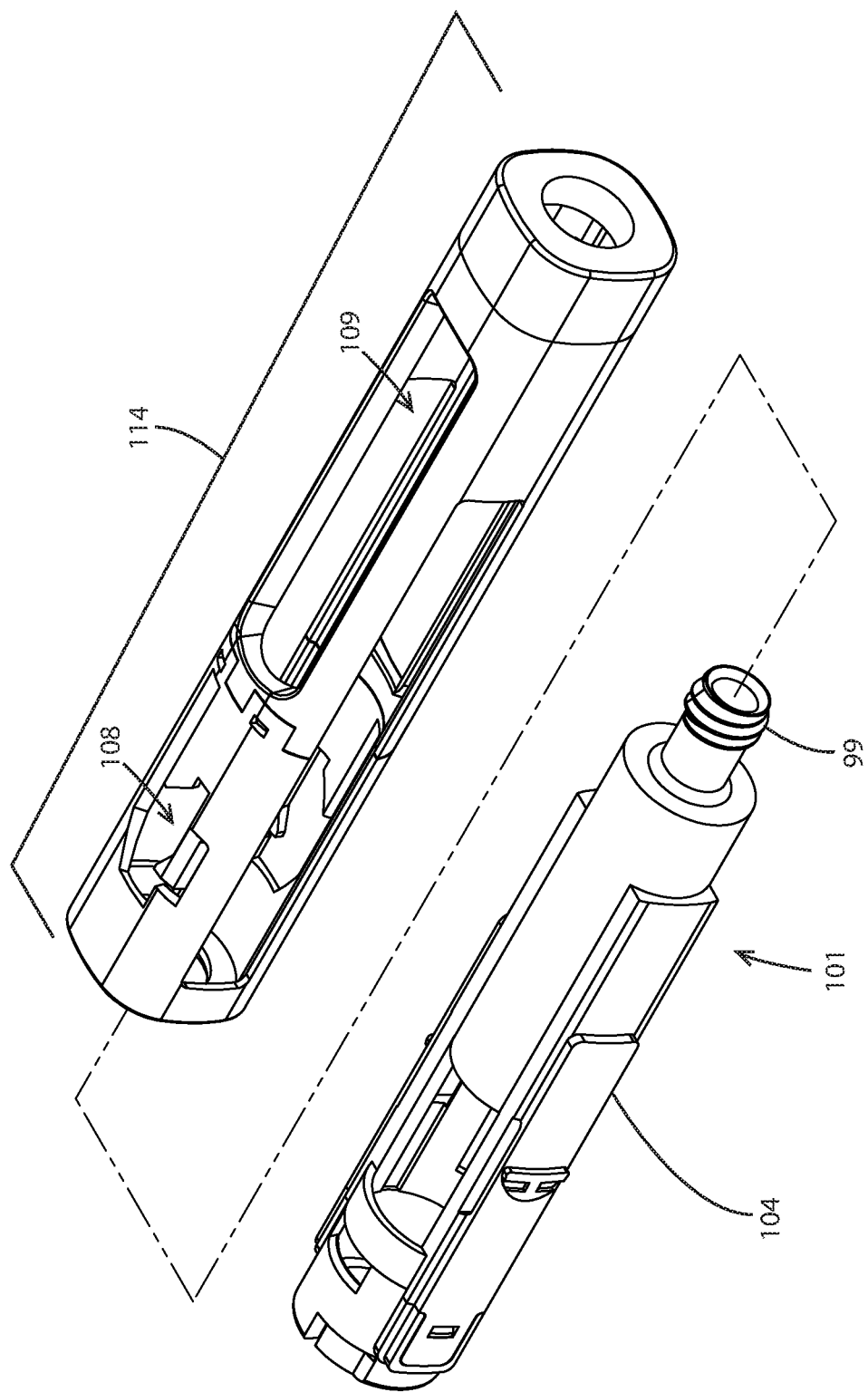
FIG. 3B is an exploded view of the safety shield embodiment shown in FIG. 3A.

For the purposes of promoting an understanding of the principles and operation of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to those skilled in the art to which the invention pertains.

In one non-limiting embodiment, a resettable injection training device 100 is provided s shown in the perspective view of FIG. 1A. In one non-limiting embodiment, the device 100 may include a manual needle insertion simulation device, wherein the device 100 simulates the sensation that occurs to a user during the use of a manual needle insertion autoinjector device. In a manual needle insertion autoinjector device, as the device including an extended safety shield is pressed against the contact surface of a target area of a user, the needle is inserted into the target area.

Figure 4C:
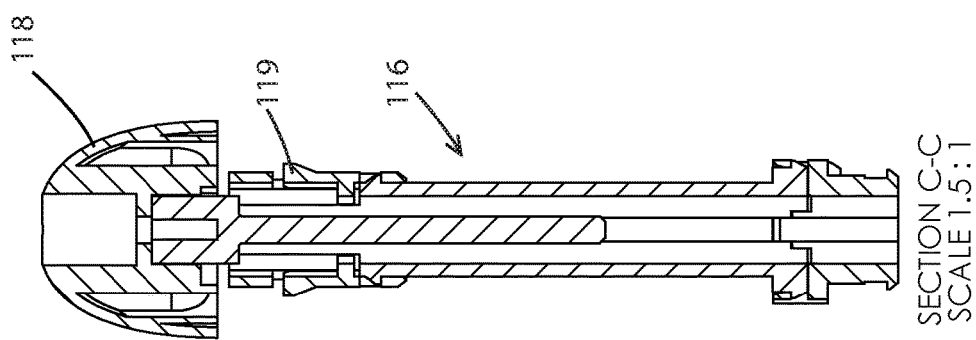
FIG. 4C is a cross sectional view of the plunger embodiment, taken at C-C of FIG. 4A.
Figure 4B:
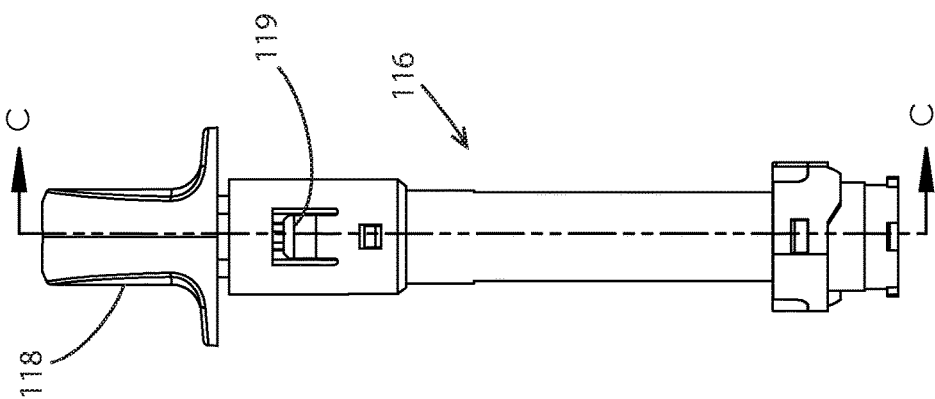
FIG. 4B is a side view of the plunger embodiment of FIG. 4A.
Figure 4A:
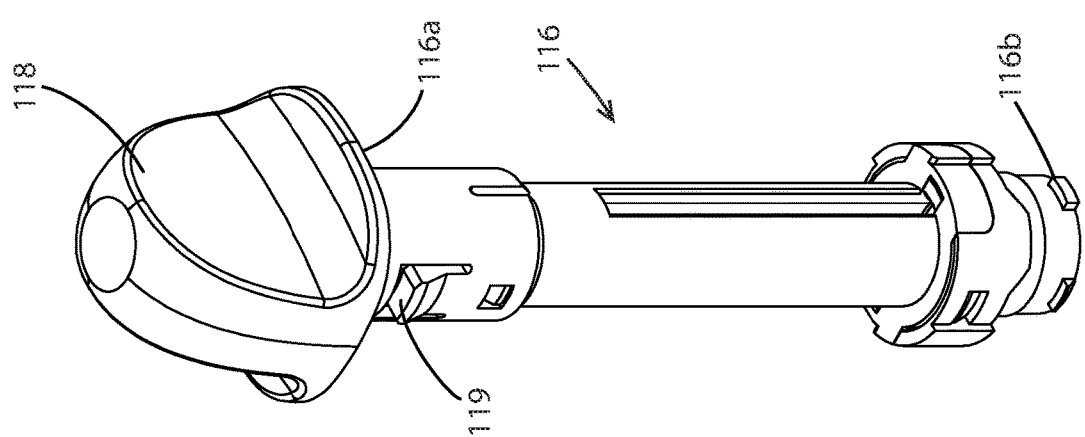
FIG. 4A is a perspective view of a plunger embodiment.
Figure 8:
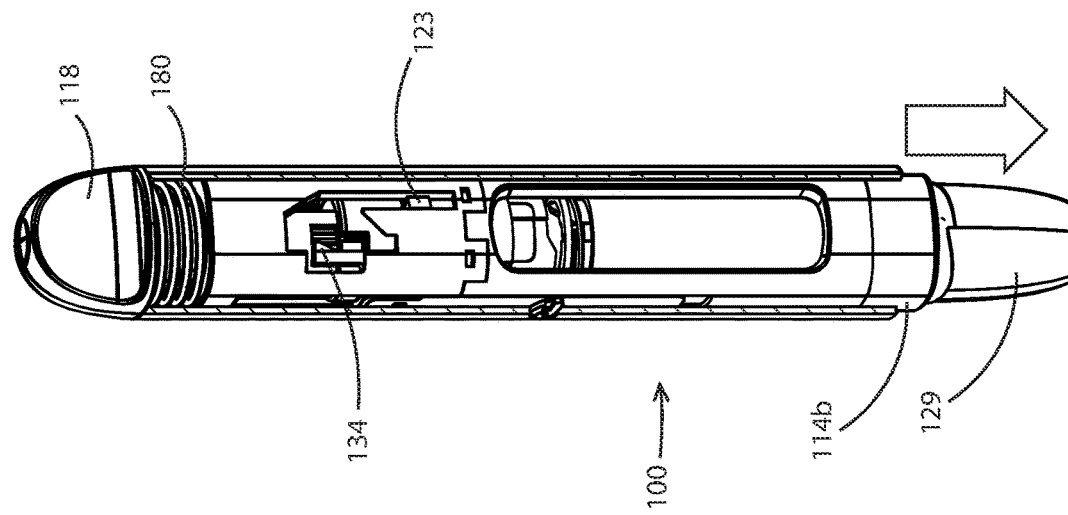
FIG. 8 is a partial cutaway view of the resettable injection training device embodiment shown in FIG. 7, wherein the device has been unlocked by way of an unlocking member.
Figure 10:
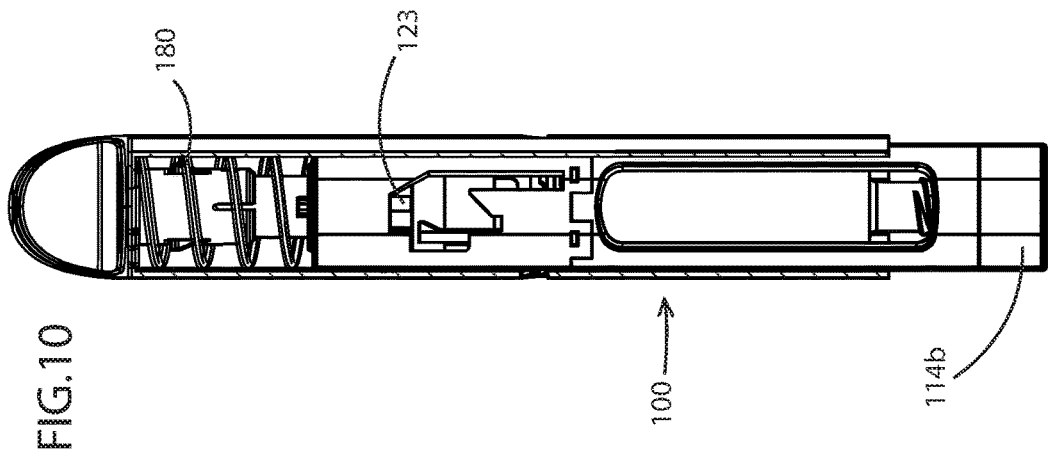
FIG. 10. is a partial cutaway view of the resettable injection training device embodiment shown in FIG. 9, upon removal of the resetting cap.

The device 100 may include, in one embodiment, an outer housing 110 having a proximal end 110a and a distal end 110b, the housing 110 defining a chamber 112 there within. The device may further include a safety shield 114 having a proximal end 114a and a distal end 114b, the safety shield 114 having a retracted, locked position as shown in a perspective view of the device in FIGS. 1A and 1n FIG. 7, a first extended unlocked position as shown in FIG. 8, a second extended unlocked position as shown in FIG. 10, and a second extended locked position as shown in FIG. 14. The device 100 further includes a plunger 116, shown in the exploded view of FIG. 1B and FIGS. 4A-4C. The plunger 116 includes a proximal end 116a and a distal end 116b, the plunger 116 having a retracted position and an extended position. An unlocking member 118 may be coupled to the proximal end of the plunger 116a as shown in FIGS. 4A-C, wherein rotation of the unlocking member 118 from a locked first position (see FIG. 7) to an unlocked second position (see FIG. 8) unlocks the device 100 and releases the safety shield 114 from its retracted, locked position as shown in FIG. 8.

FIG. 1B further provides an exploded view of the components of the device 100, including the outer housing 110 having the proximal end 110a and distal end 110b. A safety shield 114 can be disposed within the outer housing 110, in one embodiment. The safety shield includes the proximal end 114a and distal end 114b. A plunger 116 having an unlocking member 118 coupled to its proximal end, and a plunger locking tab 119 shown on the plunger. a rotating plunger locking collar 122 is also shown, and a reset cap 129 is provided. In the retracted, locked position, a portion of the safety shield 114 interfaces with the plunger locking tab 119 to maintain the safety shield in the retracted, locked position until the device 100 is unlocked by rotation of the unlocking member 118 as will be described in more detail herein.

Figure 4D:
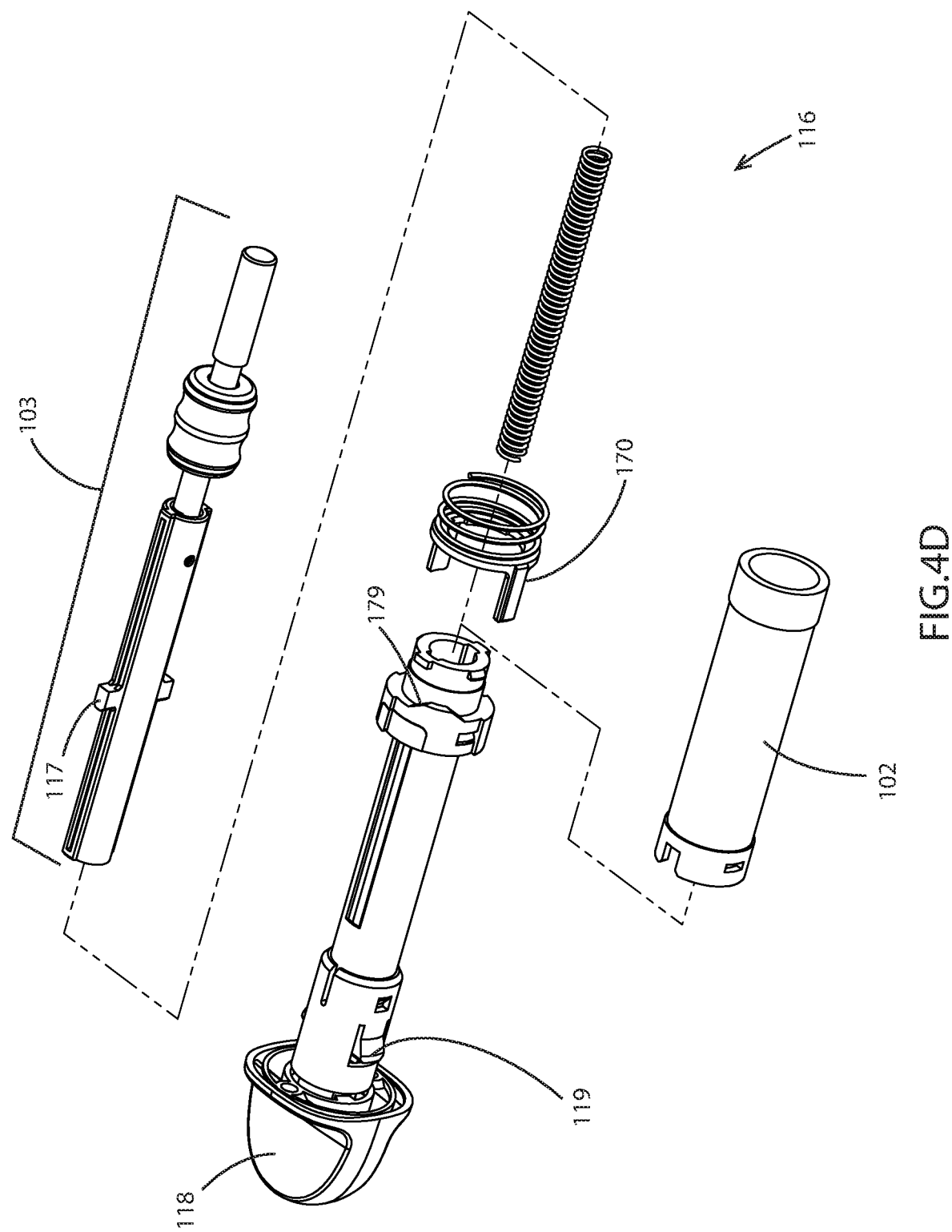
FIG. 4D is an exploded view of the plunger embodiment of FIG. 4A.

FIGS. 2A-2B include perspective and side views, respectively, of an embodiment of a safety shield reset lock 170, having a protrusion 172, and a projection 175. The safety shield reset lock 170 may also include a safety shield reset unlocking ramp 174 on a portion of the projection 175, in one embodiment. Plunger rail guides 176 are shown in FIG. 2A, and are provided to guide the plunger 116, when the plunger 116 moves along the longitudinal axis of the device 100 during use. The safety shield reset lock 170 may be used during reset of the device 100, wherein it may interact with a portion of the distal end of the plunger 116b as shown in FIG. 4D, and as will be explained in greater detail.

FIGS. 3A-3D include various views of a safety shield 114 according to one embodiment of the device 100. FIG. 3A provides a perspective view of the safety shield 114 including a proximal end 114a, and a distal end 114b. The safety shield 114 may include a viewing window 109. At its proximal end, the safety shield 114 may include a safety shield ridge 113 and a safety shield unlocking slot 115. The safety shield ridge 113 interfaces with the plunger locking tab 119 to maintain the safety shield 114 in a reset, locked position, when the unlocking member is locked. Once the unlocking member 118 is unlocked (by rotation of the unlocking member 118, therefore rotating the locking tab 119), the locking tab aligns with the unlocking slot 115 at the proximal end of the safety shield 114, allowing the safety shield 114 to be released from its retracted, locked position as shown in FIG. 8.

FIG. 3B provides an exploded view of an embodiment of the safety shield 114, having an outer portion 101 and an internal housing 104. In the outer portion 101 of the safety shield 114, a device status window 108 may be provided, and an optional threaded portion 99 is provided on a distal end thereof. FIG. 3C is a cross-sectional view of the safety shield 114 embodiment, taken at A-A of FIG. 3D, providing a view of the device status window 108. FIG. 3D provides a side view of the safety shield 114.

FIGS. 4A-4C include various views of an embodiment of a plunger 116. The plunger 116 includes a proximal end 116a, a distal end 116b, a plunger locking tab 119 featured near the proximal end 116a and an unlocking member 118 disposed at the proximal end 116a of the plunger. In one non-limiting embodiment, the unlocking member 118 is coupled to the plunger 116, such that rotation of the unlocking member 118, cooperatively rotates the plunger 116. FIG. 4A is a perspective view of the plunger, and FIG. 4B is a side view of the plunger 116 embodiment, wherein the cross-sectional view of the plunger shown in FIG. 4C is taken at C-C of FIG. 4B.

FIG. 4D provides an exploded view of the plunger embodiment 116, wherein a plunger rod 103 having a plunger protrusion 117 is shown. The plunger rod 103 is configured to be placed within the plunger 116 main housing as shown in FIG. 4D. On a distal portion of the plunger, a plunger ramp 179 is provided. This plunger ramp 179 may interface with the projections 175 on the safety shield reset lock 170 (of FIGS. 2A-2B) during reset of the device 100. One or more biasing members are associated with the plunger to allow rotation, extension and retraction of the plunger 116. A vial component 102 is also provided, wherein the vial component 102 may appear in the viewing window 109 of the safety shield 114 when the device 100 is assembled. In another, non-limiting embodiment, the viewing window 109 may be used to provide a view into the internal components of the device 100. The vial component 102 may include information about the device 100, an image or graphic may indicate the current state of the device 100 during use of the device 100, or other images or information. In one non-limiting example, two or more images may be provided on the vial component 102, wherein one image shows a drug in a pre-mixed state, and another image shows the drug in a mixed state, so a user can distinguish the visual difference between the appearance of the drug when it is mixed versus unmixed. This can be used to train a user to correctly mix a drug by manipulating the device 100, for example, prior to use. The two or more images may be viewed at the same time on the vial component 102, by rotation of the device 100. Two or more viewing windows 109 may also be provided on the device 100 to view the images.

FIGS. 5A-D provide various views of an embodiment of a rotating plunger locking collar 122. FIG. 5A is a perspective view of the rotating plunger locking collar 122, having a locking collar base 126, a biasing member 124, and a locking collar ring 125. In the embodiment shown herein, the base 126 and the ring 125 are shown as separate components; however, these components may be provided as one single component in another non-limiting embodiment. On an inner surface of the locking collar base 126, a reset ramp 121 may be found. The reset ramp 121 is involved in reset of the device 100 as will be described in greater detail in the Figures that follow. The rotating plunger locking collar 122 also includes a safety shield locking tab 123 as shown.

FIG. 5B shows an exploded view of an embodiment of the rotating plunger locking collar 122, wherein a biasing member 124 is provided as a torque spring, in one non-limiting embodiment. Near a lower portion of the locking collar base 126, a locking notch 176 is provided. The locking tab 123 is also shown on the base 126 portion. The locking collar ring 125 includes a number of projections extending into the center of the ring 125 as shown in FIG. 5C. Each projection includes a rotating plunger locking collar protrusion 128, and a plunger reset ramp 131 as shown in FIG. 5D. In the assembled view of FIG. 5A, an unlocking groove 130 can be seen.

Figure 6C:
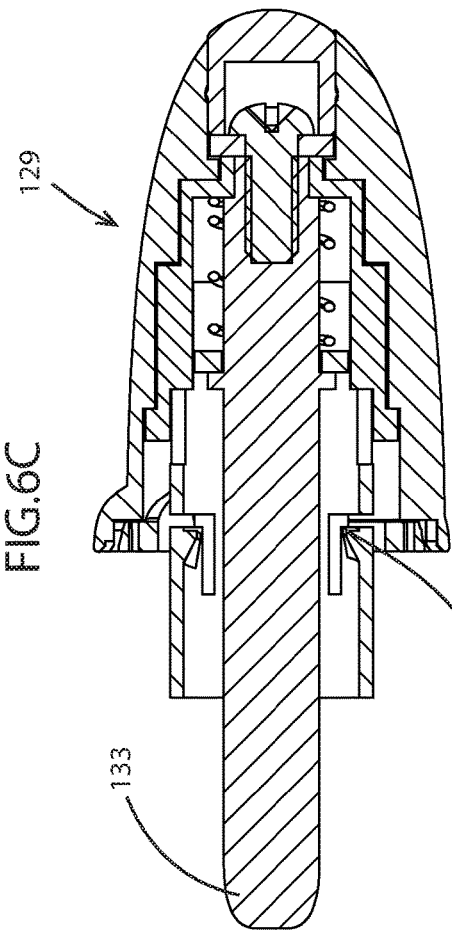
FIG. 6C is a cross-sectional view of a resetting cap taken at E-E of FIG. 6B.
Figure 6B:
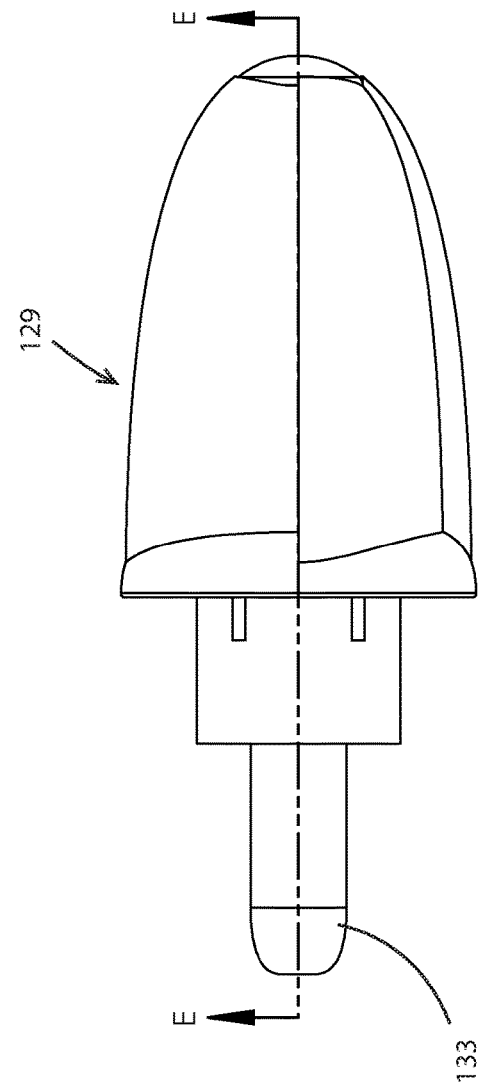
FIG. 6B is a side view of a resetting cap.
Figure 6A:
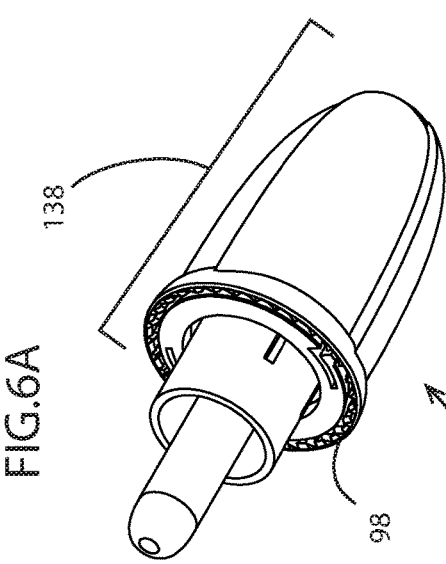
FIG. 6A is a perspective view of a resetting cap.
Figure 6D:
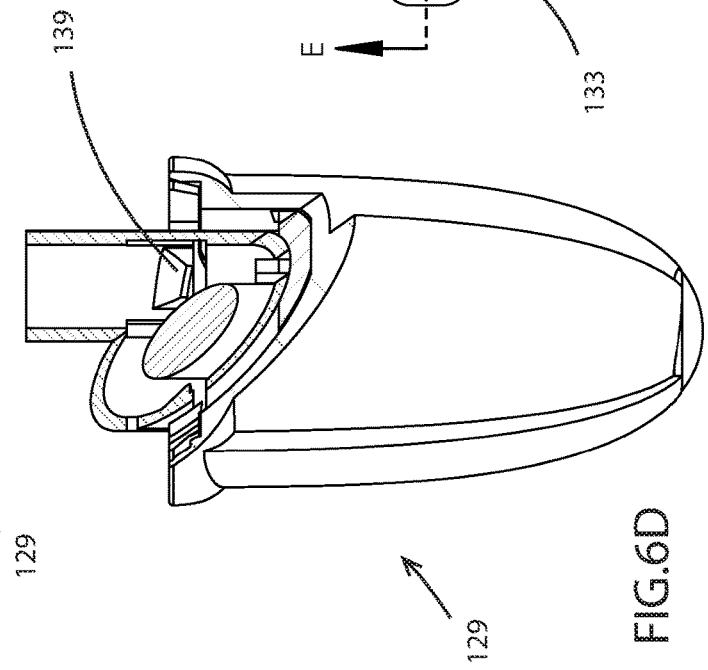
FIG. 6D is a sectional view of a resetting cap.

FIGS. 6A-6D provide various views of a resetting cap embodiment 129, which may be provided on the distal end of the device 100 and function as a cap, but may also be used to reset the device 100 following use thereof, from a post-use position, to a pre-use position. FIG. 6A provides a perspective view of the resetting cap 129, showing the reset rod portion 133 and a reset body portion 138 having a flange 98 for interfacing with a distal portion of the device 100 (in some instances, a distal portion of the safety shield 114b). FIG. 6B is a side view of the reset cap 129, also showing the reset rod portion 133, and FIG. 6C is a cross sectional view of the resetting cap 129, wherein the cross section is taken at E-E of FIG. 6B, showing the reset rod portion 133 and a thread portion 139 for interfacing with a threaded portion of the safety shield 99 shown in FIG. 3B. FIG. 6D is a sectional view of the resetting cap 129 showing thread portion 139.

Figure 7:
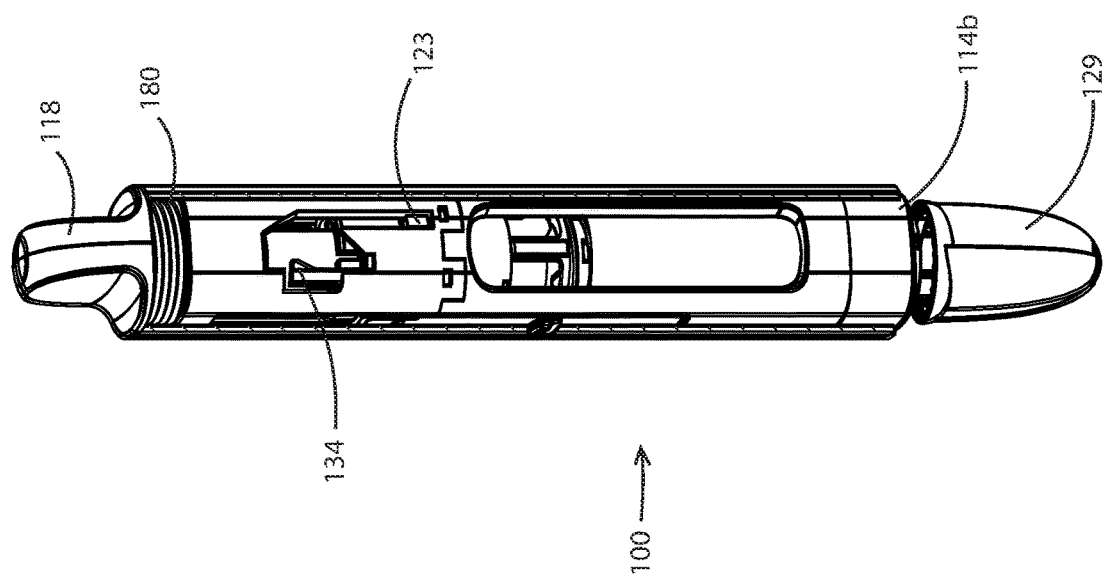
FIG. 7 is a partial cutaway view of an embodiment of the resettable injection training device embodiment shown in FIG. 1.

General operation of the device embodiment 100 is shown in the subsequent Figures. The operation shown may be modified, and the following is only presented as a non-limiting example of the function of the device 100. FIG. 7 includes a partial cutaway view of the device 100 prior to use. Rotation of the unlocking member 118, effectively rotates the plunger 116 as described above, such that the plunger locking tab 119 is rotated to align with the unlocking slot 115 of the safety shield 114, allowing the safety shield 114 to be unlocked from its reset position, and released as shown in FIG. 8. The safety shield 114 moves distally until its distal end 114b abuts the resetting cap 129 as can be seen in FIG. 8, limiting its distal movement. FIG. 7 also shows the safety shield locking member 134, and safety shield locking tab 123, and the spatial orientation of the two prior to use of the device 100.

Figure 9:
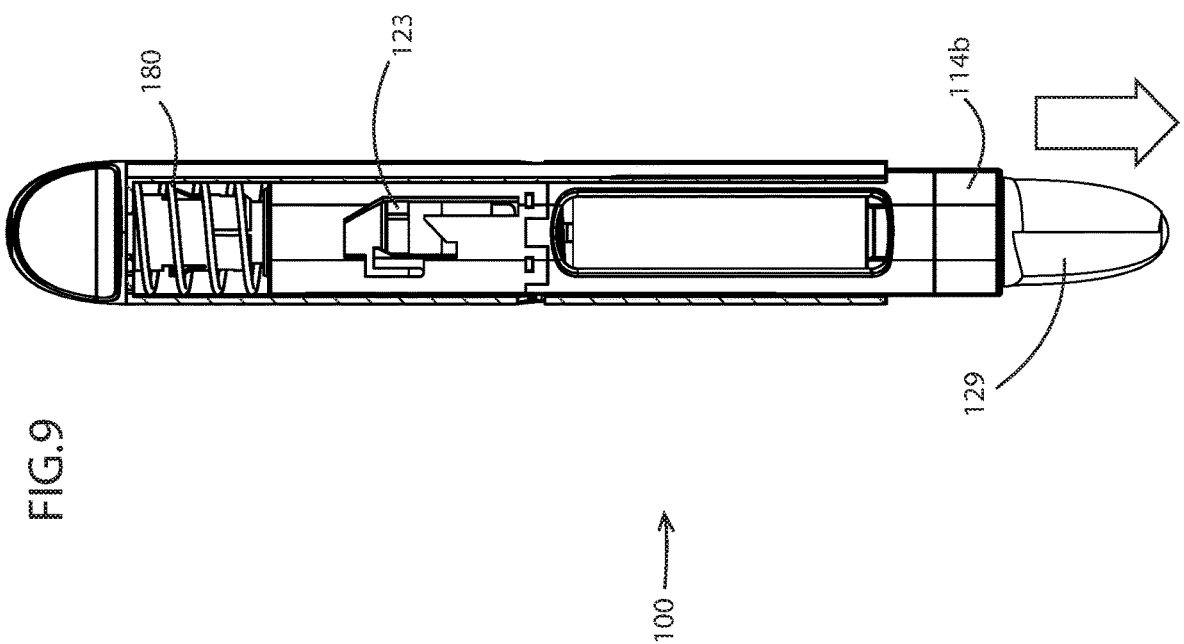
FIG. 9 is a partial cutaway view of the resettable injection training device embodiment shown in FIG. 8, partway through removal of the resetting cap.

Once the unlocking member 118 is unlocked and the safety shield 114 has extended to the first, extended unlocked position, which is maintained by the resetting cap 129 on the distal end of the device, the resetting cap 129 may be removed from the device 100 as shown in the partial cutaway view of FIGS. 9-10, to allow the safety shield 114 to fully extend to its second extended, unlocked position for use. Removal of the resetting cap 129 may occur in a number of ways; however, in the embodiment shown herein, removal occurs by twisting the resetting cap 129 off of the device 100. The distal portion of the internal assembly of the safety shield 114 includes a threaded member, and the resetting cap 129 includes a complementary threaded portion on an inner surface thereof, such that selectively twisting the cap onto the device mates the threads with one another and maintains the cap on the device. Twisting in the opposite direction, un-mates the threads and removes the resetting cap 129 from the device. However, as aforementioned, in other embodiments, the cap 129 may not be threaded, but may simply be friction fitted to the device 100, or removably fit to the device 100 in another manner, such that it may be removed by pulling the cap 129 from the end of the device 100.

Once the resetting cap 129 is removed from the distal end of the device 100, the safety shield 114 is allowed to extend to its second extended unlocked position as shown in FIG. 10, due to a safety shield biasing member 180 force extending the safety shield 114 as shown in FIGS. 8-10. The biasing member 180 may be embodied as a compression spring, in one nonlimiting embodiment.

Figure 11:
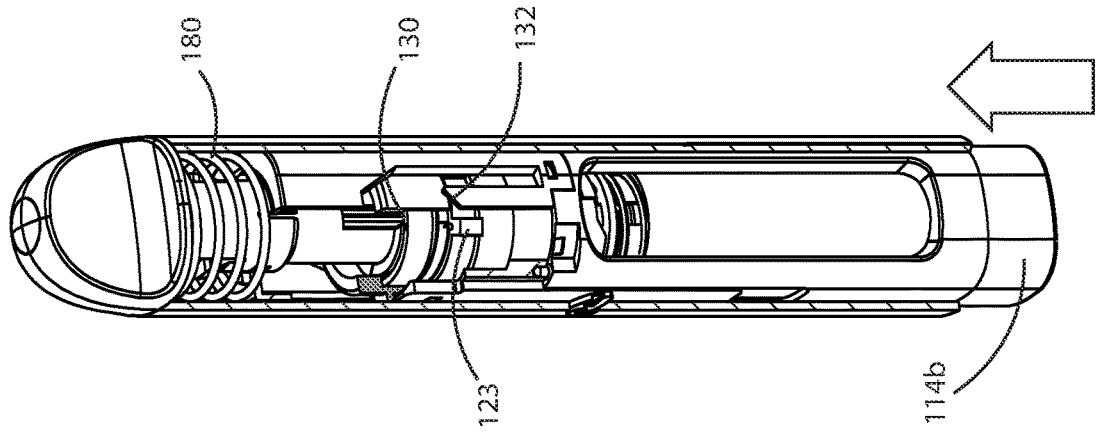
FIG. 11 is a partial cutaway view of the resettable injection training device embodiment shown in FIG. 10, upon actuation of the device, by movement of the safety shield in a proximal direction.
Figure 12:
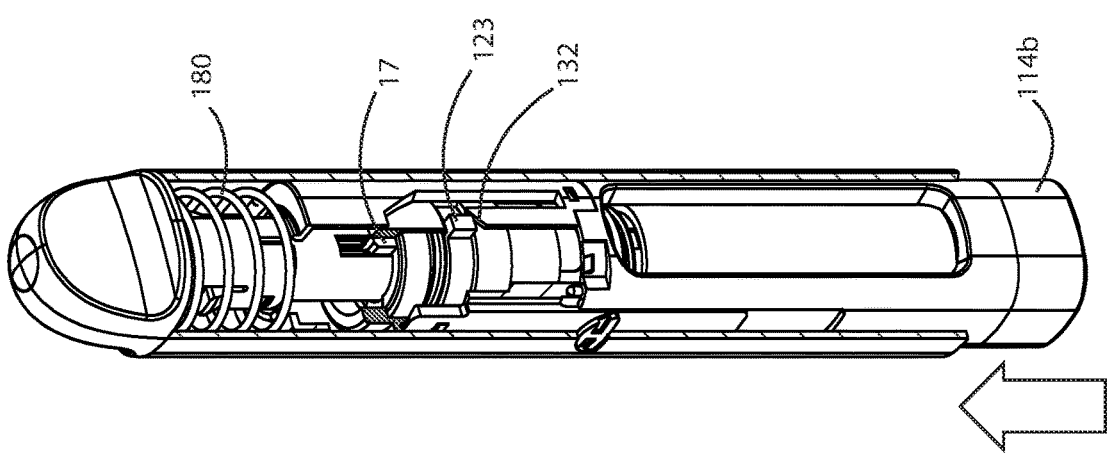
FIG. 12 shows a partial cutaway view demonstrating the internal components of the device embodiment during continued movement of the safety shield in the proximal direction relative to the device, wherein a plunger is released.

In the partial cutaway view of FIG. 10, the cap 129 (not shown in FIG. 10) has been removed, and the safety shield 114 has fully extended to a second extended, unlocked position as described. The movement of the locking tab 123 can be shown in FIGS. 9-10 during operation of the device 100. When the shield 114 is in the second extended, unlocked position, the device 100 is ready for actuation. Pressing the safety shield 114 down onto a surface (i.e., a target surface of a user), or initiating a force onto the distal end of the safety shield to move the safety shield in a proximal direction relative to the device 100 initiates actuation of the simulated injection of the device 100 as shown in FIG. 11. During this actuation, a safety shield unlocking ramp 132 interfaces with the safety shield locking tab 123, so as to rotate the rotating plunger locking collar 122, moving the plunger locking collar protrusion 128 out of the way of the plunger tab 117, allowing the plunger tab 117 to align with the unlocking groove 130 on the rotating plunger locking collar 122 providing release of the plunger 116 in a distal direction to complete actuation of the device 100 as shown in FIG. 12. The plunger biasing member releases energy to extend the plunger 116 distally. Completing one actuation of the device 100, rendering the device 100 in the post-use position shown in FIG. 13.

Once the device has been actuated, the force on the safety shield distal end is removed (i.e., by lifting the device 100 from the target surface of the user), the safety shield locking tab 123 moves past the safety shield locking member 134, and the safety shield 114 extends to a second extended locked position as shown in FIG. 14. The second extended locked position of the safety shield is maintained, at least in part, by an interaction between the locking tab 123 and the safety shield locking member 134 in this position as shown in FIG. 14. Once the device 100 has been used, it can be reset for a subsequent use.

Figure 15:
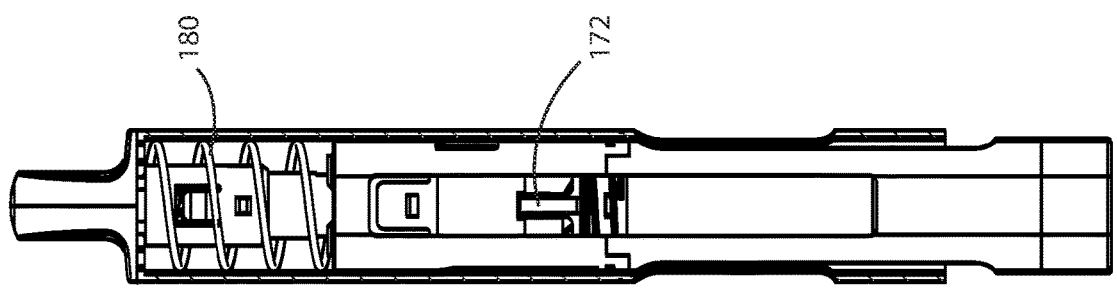
FIG. 15 is a partial cutaway view revealing the internal components of the device embodiment prior to reset.
Figure 16:
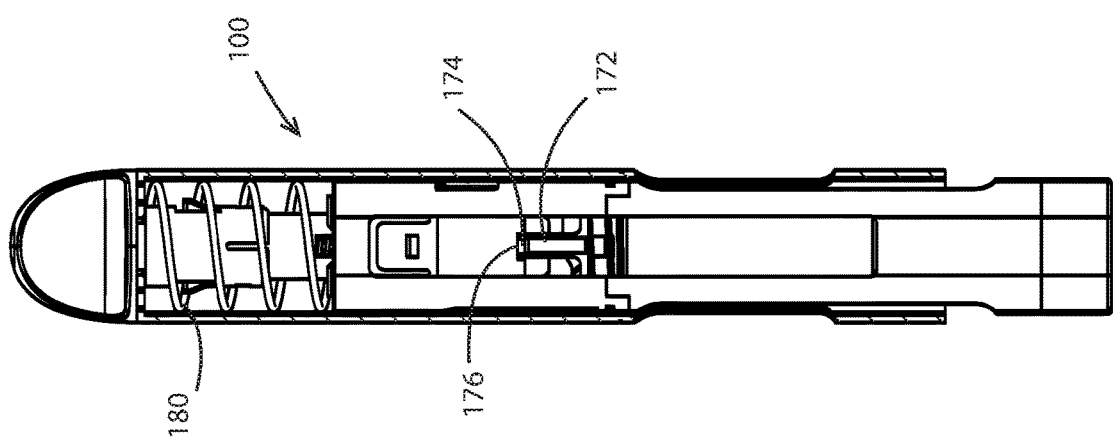
FIG. 16 shows a partial cutaway view showing the internal components of the device embodiment once the unlocking member has been locked, during a first step of reset in an embodiment of the device.

Reset of the device 100 may occur, in one embodiment, by rotation of the unlocking member 118 to lock the unlocking member (in one non-limiting example, rotation occurs in a direction opposite the direction required to unlock the unlocking member 118) prior to the subsequent steps of resetting the device 100. However, in other embodiments, this first step of locking the unlocking member 118 may not be required. FIG. 15 shows a partial cutaway view of the device following use, prior to rotation of the unlocking member 118, wherein the Following locking of the unlocking member 118, wherein the protrusion 172 interfaces with a locking notch 176 of the rotating plunger locking collar 128. Therefore, preventing resetting of the device 100 with the resetting cap 129 until the unlocking member 118 is locked, (positioned back to its starting position). Locking of the unlocking member 118 as shown in FIG. 16, creates a gap 174 between the protrusion and the locking notch 176, allowing the device to be reset with the resetting cap 179.

This gap 174 is created by way of an interaction between the safety shield reset unlocking ramp 174 on a portion of the projection 175 of the safety shield reset lock 170 and the plunger ramp 179 on the distal end of the plunger 116.

As shown in the partial cutaway views of FIGS. 17-18, placement of the resetting cap 129, having a reset cap body portion 138 and a reset rod portion 133, on the distal portion of the device 100 (distal end of the safety shield 114b) allows the reset to continue (or in some instances, initiates the reset) of the device 100. Continued movement of the resetting cap 129 in a proximal direction continues the reset process. Movement of the resetting cap 129 in a proximal direction relative to the device 100 so that the reset rod portion 133 interfaces with the distal portion of the plunger 116b, continues the reset. This action moves the plunger 116 in a proximal direction, wherein the plunger protrusion 117 interfaces with the reset ramp 140, to rotate the rotating plunger locking collar 122 to a reset position, and allowing the plunger 116 to further move toward the proximal end of the device 100 to its reset position.

Completion of the reset occurs by an interface between the flange 98 on the reset cap body 138 portion and a distal portion of the safety shield 114b, as shown in FIG. 18. Completion of the reset may occur by twisting the resetting cap 129 to thread the cap onto the distal end of the inner housing of the safety shield 114, in instances where a threaded cap and threaded device portion are mated together, or by sliding the resetting cap 129 onto the distal end of the device 100 or safety shield 114, specifically, (in embodiments wherein the reset cap 129 is not threaded). FIG. 18 shows the internal housing view of the device in a fully reset position, wherein the shield is in a retracted, locked position. FIGS. 19-20 provide a view of the outer portion of the device 100, showing the outer assembly view of FIGS. 17-18, respectively. FIG. 20, wherein the device 100 is in a reset position, the safety shield locking tab 123 can be found in its original starting position.

In embodiments herein, a device 100 including a device status window 108 in the safety shield 114 may be provided to demonstrate a status of the device 100 during use to a user by viewing the position of the safety shield locking tab 123, which moves within the status window 108 throughout the use and reset of the device 100 as can be seen in the corresponding Figures herein.

As used herein, the terms "subject", "user" and "patient" are used interchangeably. As used herein, the term "subject" refers to an animal, preferably a mammal such as a non-primate (e.g., cows, pigs, horses, cats, dogs, rats etc.) and a primate (e.g., monkey and human), and most preferably a human.

It is to be noted that the terms "first," "second," and the like as used herein do not denote any order, quantity, or importance, but rather are used to distinguish one element from another. The terms "a" and "an" do not denote a limitation of quantity, but rather denote the presence of at least one of the referenced item. Furthermore, to the extent that the terms "including," "includes," "having," "has," "with," or variants thereof are used in either the detailed description and/or the claims, such terms are intended to be inclusive in a manner similar to the term "comprising." The modifier "about" used in connection with a quantity is inclusive of the stated value and has the meaning dictated by the context (e.g., includes the degree of error associated with measurement of the particular quantity). It is to be noted that all ranges disclosed within this specification are inclusive and are independently combinable.

It should be borne in mind that all patents, patent applications, patent publications, technical publications, scientific publications, and other references referenced herein are hereby incorporated by reference in this application in order to more fully describe the state of the art to which the present invention pertains.

Reference to particular buffers, media, reagents, cells, culture conditions and the like, or to some subclass of same, is not intended to be limiting, but should be read to include all such related materials that one of ordinary skill in the art would recognize as being of interest or value in the particular context in which that discussion is presented. For example, it is often possible to substitute one buffer system or culture medium for another, such that a different but known way is used to achieve the same goals as those to which the use of a suggested method, material or composition is directed.

It is important to an understanding of the present invention to note that all technical and scientific terms used herein, unless defined herein, are intended to have the same meaning as commonly understood by one of ordinary skill in the art. The techniques employed herein are also those that are known to one of ordinary skill in the art, unless stated otherwise. For purposes of more clearly facilitating an understanding the invention as disclosed and claimed herein, the following definitions are provided.

While a number of embodiments of the present invention have been shown and described herein in the present context, such embodiments are provided by way of example only, and not of limitation. Numerous variations, changes and substitutions will occur to those of skill in the art without materially departing from the invention herein. For example, the present invention need not be limited to best mode disclosed herein, since other applications can equally benefit from the teachings of the present invention. Also, in the claims, means-plus-function and step-plus-function clauses are intended to cover the structures and acts, respectively, described herein as performing the recited function and not only structural equivalents or act equivalents, but also equivalent structures or equivalent acts, respectively. Accordingly, all such modifications are intended to be included within the scope of this invention as defined in the following claims, in accordance with relevant law as to their interpretation.

What is claimed is:

1. A resettable injection training device, comprising:
   an outer housing having a proximal end and a distal end, the housing defining a chamber there within;
   a safety shield comprising a proximal end and a distal end, the safety shield having a retracted, locked position, a first extended unlocked position, a second extended unlocked position, and an extended locked position;
   a plunger comprising a proximal end and a distal end, the plunger having a retracted position and an extended position;
   a rotating plunger locking collar;
   an unlocking member coupled to the plunger, wherein rotation of the unlocking member from a first position to a second position releases the safety shield from the retracted, locked position, unlocking the device; and
   a resetting cap, wherein removal of the resetting cap from a distal end of the housing allows the safety shield to move from the first extended unlocked position to the second extended unlocked position.

2. The resettable injection training device 1, wherein when in the second, extended locked position, a force on the distal end of safety shield retracts the safety shield and releases the plunger from the retracted position to the extended position.

3. The resettable injection training device of claim 2, wherein when the plunger is in the extended position, release of the force on the distal end of the safety shield allows the safety shield to extend to the second extended locked position.

4. The resettable injection training device of claim 3, wherein placement of the cap onto the distal end of the device, and movement of the cap in a proximal direction relative to the device resets the plunger to its retracted position, and resets the safety shield from the second extended, locked position to the retracted, locked position.

5. The resettable injection training device of claim 3, wherein release of the force on the distal end of the safety shield causes the safety shield to extend to a second extended locked position, wherein an interface between a safety shield locking member and a rotating plunger locking collar safety shield locking tab prevents retraction of the safety shield.

6. The resettable injection training device of claim 3, wherein to reset the plunger to the retracted position and to the safety shield to the retracted, locked position, rotation of the unlocking member from the second position to the first position initiates reset.

7. The resettable injection training device of claim 6, further comprising placement of the cap onto the distal end of the device, and movement of the cap in a proximal direction relative to the device, to reset the plunger to its retracted position, and reset the safety shield from the second extended, locked position to the retracted, locked position.

8. The resettable injection training device of claim 1, wherein the plunger comprises a plunger locking tab, and the safety shield comprises a locking ridge, wherein the locking ridge interfaces with the plunger locking tab to maintain the safety shield in the retracted, locked position.

9. The resettable injection training device of claim 8, wherein rotation of the unlocking member removes the interface between the plunger locking tab and the locking ridge, allowing the safety shield to extend.

10. The resettable injection training device of claim 1, further comprising an inner housing comprising a proximal end and a distal end, wherein the inner housing proximal end is configured to maintain the safety shield in the second, extended, unlocked position, following unlocking of the device via the unlocking member, wherein the inner housing proximal end abuts the locking ridge of the safety shield.

11. The resettable injection training device of claim 1, wherein actuation of the device is initiated by applying a force to the distal end of the safety shield in a proximal direction, wherein proximal movement of the safety shield relative to the outer housing causes a safety shield unlocking ramp to interface with a safety shield locking tab on the rotating plunger locking collar, causing axial rotation of the rotating plunger locking collar relative to the plunger to release the plunger from a retracted, locked position.

12. The resettable injection training device of claim 1, wherein the rotating plunger locking collar comprises an unlocking groove on an inner surface thereof, wherein when the unlocking groove aligns with a plunger protrusion on an outer surface of the plunger, the plunger extends to the extended position.

13. The resettable injection training device of claim 12, wherein the plunger protrusion further comprises a plunger protrusion reset ramp, the plunger protrusion reset ramp for interfacing with a rotating plunger locking collar reset ramp on an inner surface of the rotating plunger locking collar during reset of the device.

14. The resettable injection training device of claim 13, wherein the reset cap comprises a reset projection and a body portion, such that insertion of the reset projection into the distal end of the device, and movement toward the proximal end of the device moves the plunger in a proximal direction and the safety shield in a proximal direction to reset the plunger to the retracted, locked position, and reset the safety shield to the retracted, locked position.

15. The resettable injection training device of claim 14, wherein the reset cap is moved in the device proximally, until the plunger protrusion reset ramp interfaces with the rotating plunger locking collar reset ramp, causing axial movement of the rotating plunger locking collar, and moving the safety shield proximally until the plunger locking tab interfaces with the safety shield locking ridge.

16. The resettable injection training device of claim 1, further comprising a biasing member associated with the rotating plunger locking collar, wherein the biasing member biases the rotating plunger locking collar in a counter-clockwise direction from the proximal end.

17. A method of resetting a resettable injection training device having a safety shield and a plunger, wherein the safety shield is in an extended, locked position and the plunger is in an extended position, the method comprising:

inserting a resetting cap into a distal end of the resettable injection training device, the device comprising:
  an outer housing defining a chamber there within;
  a plunger having a retracted position and the extended position; and
  a rotating plunger locking collar;
  a rotating plunger locking collar;
  wherein the safety shield has a retracted locked position, a first extended unlocked position, a second extended unlocked position, and the extended locked position; and moving the cap in a proximal direction relative to the device to contact the plunger and reset the plunger the extended position to the retracted position, and reset the safety shield from the extended, locked position to the retracted, locked position.

18. The method of claim 17, wherein the resettable injection training device further comprises an unlocking member coupled to the plunger, having a locked first position and an unlocked second position, such that rotation of the unlocking member from the first position to the second position releases the safety shield, wherein prior to inserting the resetting cap into the distal end of the resettable injection training device, the unlocking member is moved from the second position to the first position.

* * * * *